(12) United States Patent
Gray et al.

(10) Patent No.: US 7,191,646 B1
(45) Date of Patent: Mar. 20, 2007

(54) POSITIVE DISPLACEMENT FLOW METER

(75) Inventors: Thomas J. Gray, Pewaukee, WI (US); Raymond Clark, Lac du Flambeau, WI (US)

(73) Assignee: Link-Tech, Inc., Pawaukee, WI (US)

( * ) Notice: Subject to any disclaimer, the term of this patent is extended or adjusted under 35 U.S.C. 154(b) by 135 days.

(21) Appl. No.: 11/178,643

(22) Filed: Jul. 11, 2005

Related U.S. Application Data

(60) Provisional application No. 60/587,076, filed on Jul. 12, 2004.

(51) Int. Cl.
*G01F 3/14* (2006.01)

(52) U.S. Cl. ....................................................... 73/239

(58) Field of Classification Search .................. 73/265, 73/239, 264; 417/465
See application file for complete search history.

(56) References Cited

U.S. PATENT DOCUMENTS

| | | | |
|---|---|---|---|
| 3,630,178 A | 12/1971 | Erickson | |
| 4,090,817 A | 5/1978 | Erickson | |
| 4,110,060 A * | 8/1978 | Erickson | ...................... 417/462 |
| 4,281,541 A * | 8/1981 | Strengowski | ................ 73/264 |
| 4,325,331 A | 4/1982 | Erickson | |
| 4,353,331 A | 10/1982 | Erickson | |
| 4,437,437 A | 3/1984 | Erickson | |
| 4,649,801 A | 3/1987 | Johnson | |
| 5,341,774 A | 8/1994 | Erickson | |
| 5,626,106 A | 5/1997 | Erickson et al. | |

* cited by examiner

*Primary Examiner*—Jewel Thompson
(74) *Attorney, Agent, or Firm*—Quarles & Brady LLP

(57) ABSTRACT

A flow meter includes a meter body defining a cavity having opposing ends joined by opposed sides at corners. At least one of the corners is recessed to form a reservoir. A box frame defining a frame interior is received in the cavity for reciprocal movement between the cavity ends. A sliding block defining a circular cavity is received in the frame interior for reciprocal movement therein said frame interior. A valve disc is received in the circular cavity for rotational movement therein. The valve disc includes an eccentric hole formed therethrough. A shaft extending through the eccentric hole is rotatably fixed to the valve disc. Fluid flowing through the flow meter reciprocally moves the box frame and sliding block to rotate the valve disc and the shaft.

9 Claims, 9 Drawing Sheets

POSITIVE DISPLACEMENT FLOW METER

CROSS REFERENCES TO RELATED APPLICATIONS

This application claims the priority benefit of U.S. Provisional Patent Application No. 60/587,076 filed on Jul. 12, 2004.

STATEMENT REGARDING FEDERALLY SPONSORED RESEARCH

Not Applicable.

BACKGROUND OF THE INVENTION

The invention relates to flow meters, and more particularly to passive positive displacement flow meters.

Positive displacement flow meters, such as disclosed in U.S. Pat. No. 4,110,060 which is fully incorporated herein by reference, are well known. One particular flow meter, the Ranger 3000-15B offered for sale by Link-Tech, Inc. of Pewaukee, Wis., is especially useful for measuring the flow of high viscosity offset inks.

The flow meter offered by Link-Tech, Inc. is well received in the printing industry, and offers many advantages over prior flow meters. One problem with the Link-Tech, Inc. flow meter is it is expensive to manufacture because of tight tolerances that are required to produce a reliable and sensitive meter. Another problem with the Link-Tech, Inc. flow meter is wear between the moving parts in the flow meter. Therefore, a need exists for an improved flow meter.

BRIEF SUMMARY OF THE INVENTION

The present invention provides a reliable and sensitive positive displacement flow meter that is easy to manufacture. The flow meter includes a meter body defining a cavity having opposing ends joined by opposed sides at corners. At least one of the corners is recessed to form a reservoir. A box frame defining a frame interior is received in the cavity for reciprocal movement between the cavity ends. A sliding block defining a circular cavity is received in the frame interior for reciprocal movement therein said frame interior. A valve disc is received in the circular cavity for rotational movement therein. The valve disc includes an eccentric hole formed therethrough. A shaft extending through the eccentric hole is rotatably fixed to the valve disc. Fluid flowing through the flow meter reciprocally moves the box frame and sliding block to rotate the valve disc and the shaft. Advantageously, the recess forming the reservoir simplifies forming the walls of the cavity perpendicular to the top and bottom surfaces of the meter body. In addition, fluid urged into the reservoir by the box frame lubricates the box frame in the cavity as the box frame reciprocates in the meter body cavity.

A general objective of the present invention is to provide a positive displacement flow meter that is easy to manufacture. This objective is accomplished by forming a reservoir in an interior corner of the cavity which simplifies forming the cavity walls perpendicular to the top and bottom surfaces of the meter body.

Another objective of the present invention is to provide a reliable and sensitive positive displacement flow meter. This objective is accomplished by forming a reservoir in an interior corner of the cavity which provides lubrication between the box frame and cavity.

The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
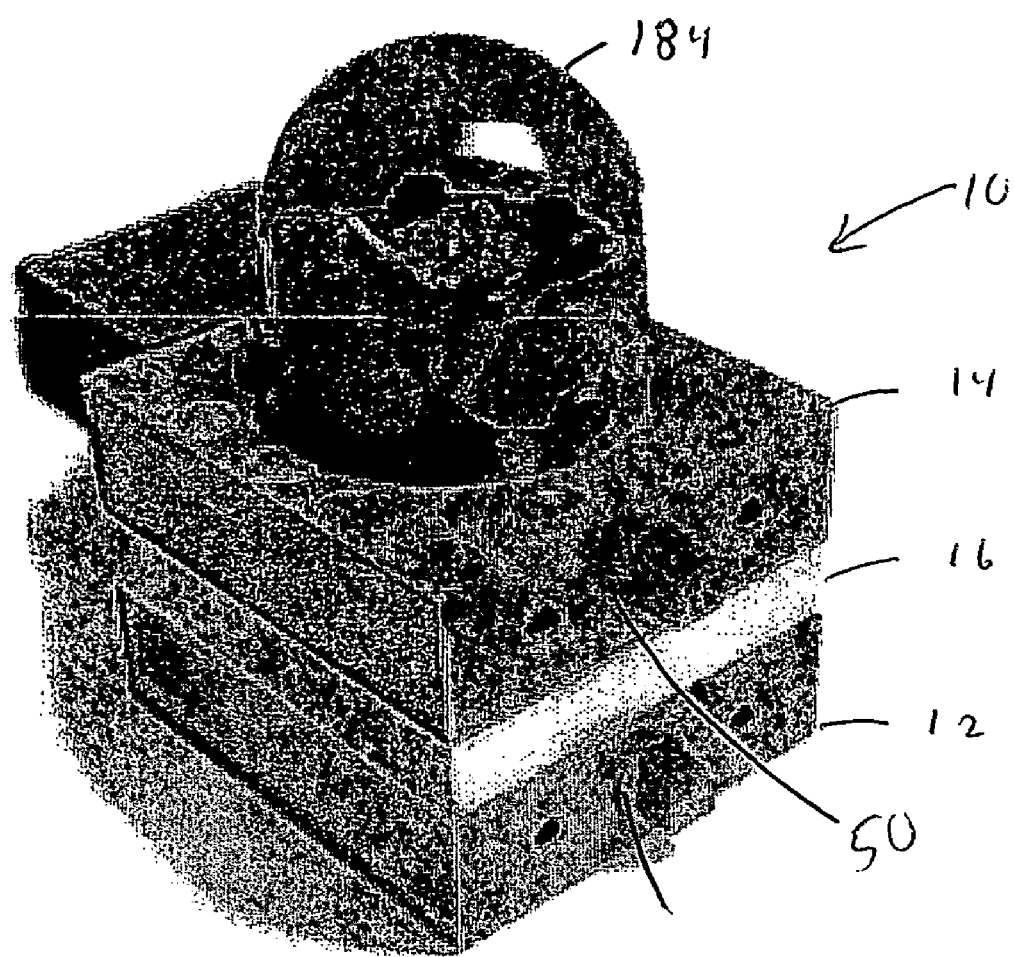
FIG. 1 is a perspective view of a ink flow meter incorporating the present invention.
Figure 2:
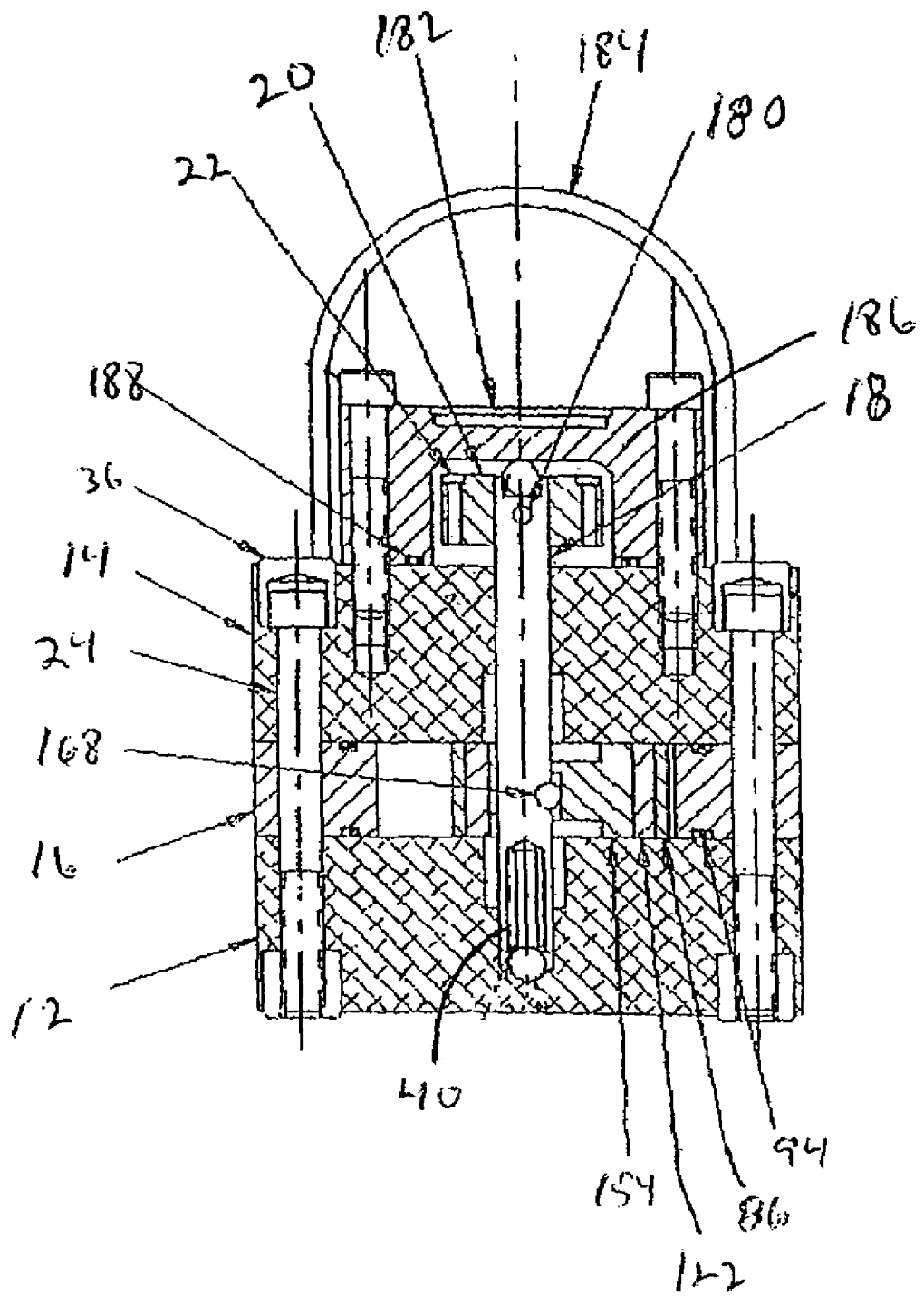
FIG. 2 is a cross sectional view of the meter of FIG. 1.

A preferred embodiment of an ink flow meter 10 shown in FIGS. 1 and 2 according to the invention is substantially similar to the Ranger 3000-15B offered for sale by Link-Tech, Inc. of Pewaukee, Wis., both in operation and general arrangement of components. Novel improvements to the prior art flow meter are described below. Although the present invention is described as an ink flow meter, the meter described herein can be used to measure the flow of any fluid.

As shown in FIGS. 1 and 2, the ink flow meter 10 includes a bottom manifold 12, a top manifold 14, and a meter body 16 sandwiched between the bottom and top manifolds 12, 14. A shaft 18 driven by ink flowing through the meter 10 rotatably drives a magnet holder 20 containing a plurality of magnets 22. The moving magnets 22 are detected by Hall Effect sensors that produces a signal corresponding to the rotation of the shaft 18. The signal can be used by circuitry, a computer, or other computing device, to determine the flow rate of ink flowing through the meter.

Figure 3:
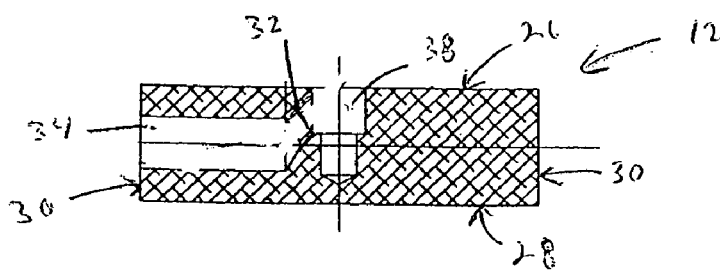
FIG. 3 is a cross sectional view of the bottom manifold of FIG. 2.
Figure 4:
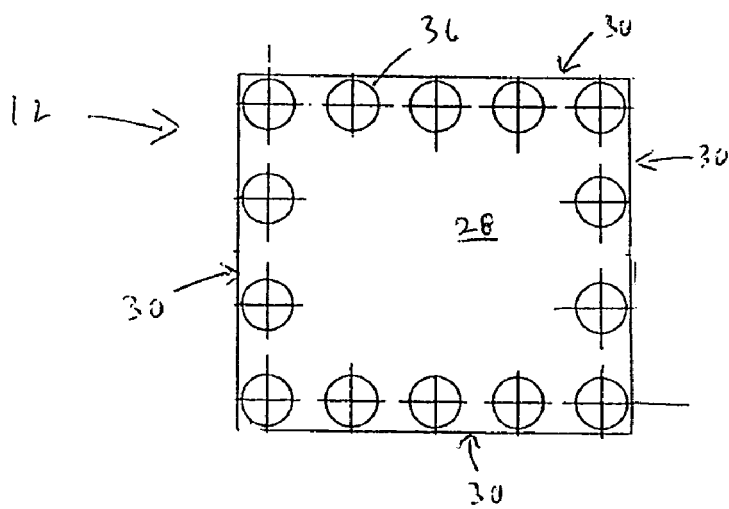
FIG. 4 is a plan view of the bottom manifold of FIG. 2.

The bottom manifold 12 shown in FIGS. 2–4 is formed from a solid block of aluminum having a top surface 26 and a bottom surface 28 joined by sides 30. A passageway 32 formed through the bottom manifold 12 receives ink through an input port 34 formed in one of the bottom manifold sides 30 and feeds the ink into the meter body 16 through the bottom manifold top surface 26. The passageway 32 centrally exhausts the ink into the meter body 16 to rotatably drive the shaft 18, as generally described below. Preferably, the bottom manifold 12 is joined to the meter body 16 and top manifold 14 by bolts 24 extending through bores 36 formed through the bottom manifold 12. A central bore 38 formed through the top surface 26 of the bottom manifold 12 receives one end 40 of the shaft 18, and forms part of the bottom manifold passageway 32.

Figure 6:
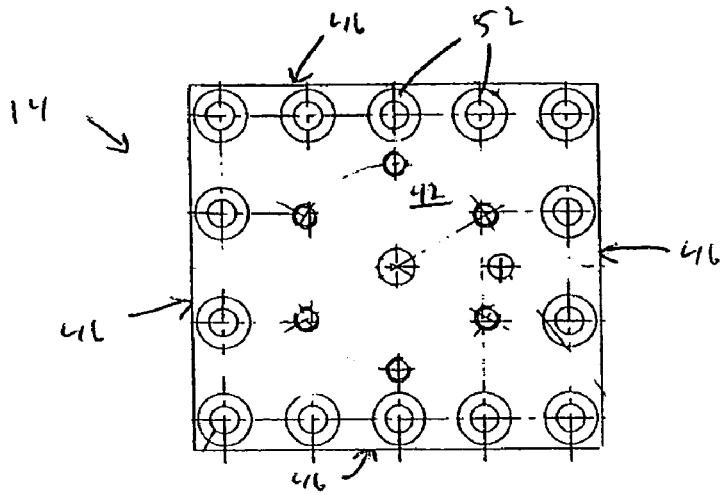
FIG. 6 is a plan view of the top manifold of FIG. 2.
Figure 5:
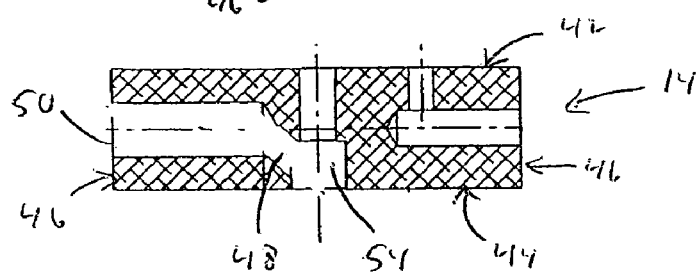
FIG. 5 is a cross sectional view of the top manifold of FIG. 2.

The top manifold 14 shown in FIGS. 2, 5, and 6 is formed from a solid block of aluminum having a top surface 42 and a bottom surface 44 joined by sides 46. A passageway 48 formed through the top manifold 14 receives ink through the top manifold bottom surface 44 from the meter body 16 and exhausts the ink through an exhaust port 50 formed in one of the top manifold sides 46. Preferably, the top manifold 14 is joined to the meter body 16 and bottom manifold 12 by the bolts 24 extending through bores 52 formed through the top manifold 14. A central bore 54 formed through the top manifold 14 receives the shaft 18 therethrough, and forms part of the top manifold passageway 48.

Figure 8:
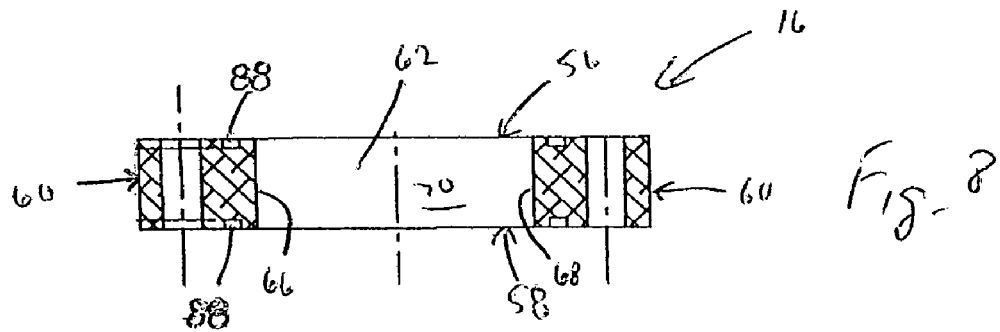
FIG. 8 is a cross sectional view of the meter body of FIG. 2.
Figure 7:
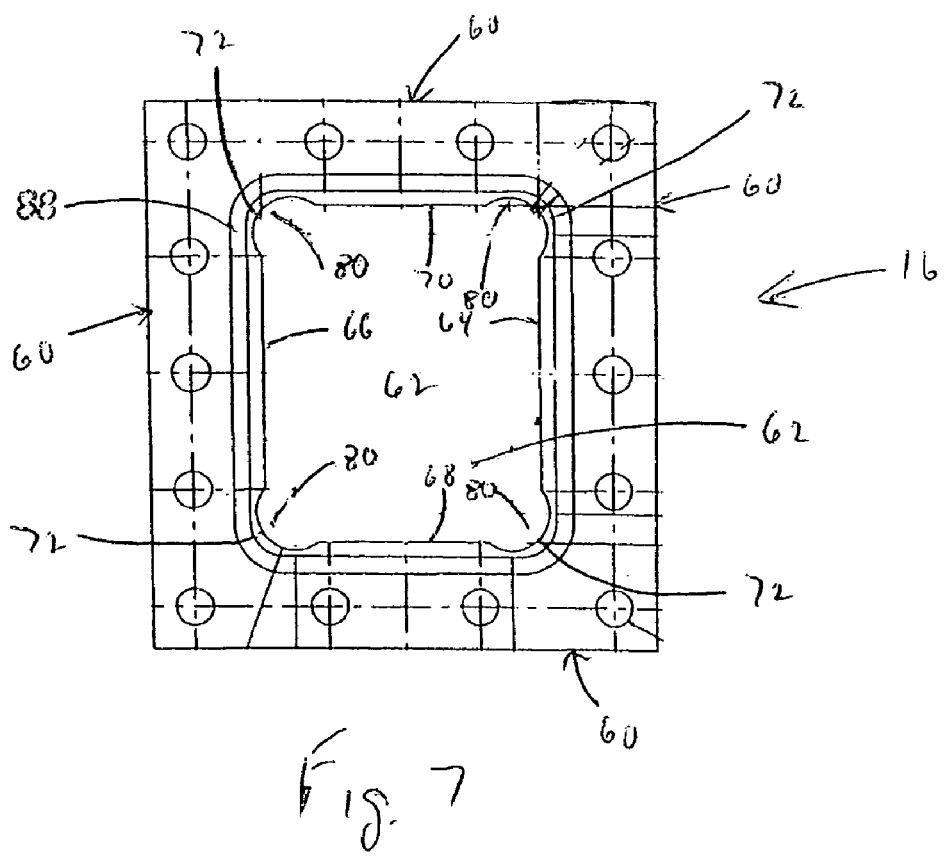
FIG. 7 is a plan view of the meter body of FIG. 2.

Referring to FIGS. 2, 7, and 8, the meter body 16 is sandwiched between the top and bottom manifolds 14, 12, and includes upper and lower surfaces 56, 58 joined by sides 60. The meter body upper surface 56 abuts the top manifold bottom surface 44, and the meter body lower surface 58 abuts the bottom manifold top surface 26. Preferably, the meter body 16 is formed from aluminum with a nickel coating. Advantageously, the thickness of the nickel coating can be controlled to provide the desired final dimensions of the meter body 16.

A cavity 62 formed in the meter body 16 using methods known in the art, such as EDM, is open to both the top and bottom manifolds 14, 12. The cavity 62 is substantially rectangular having opposing side walls 64, 66 joined by opposing end walls 68, 70. Preferably, the side walls 64, 66 and end walls 68, 70 are substantially perpendicular to the upper and lower surfaces 56, 58 of the meter body 16 to simplify installation and provide a reliable and sensitive meter 10. Importantly, interior corners 72 of the cavity 62 are recessed to form reservoirs 80 in fluid communication with a reciprocating box frame 90. Advantageously, the reservoirs 80 hold ink to lubricate the reciprocating box frame 90 and allow the side and end walls 64, 66, 68, 70 of the cavity 62 to be easily formed substantially perpendicular to the upper and lower surfaces 56, 58 of the meter body 16 along their entire length.

Grooves 88 are formed in each of the upper and lower surfaces 56, 58 of the meter body 16. The grooves 88 are spaced outwardly from the perimeter of the cavity 62. Each groove 88 receives elastomeric sealing material 86, such as an O-ring, that abuts one of the top and bottom manifolds 14, 12 to prevent leakage between the meter body 16 and the manifolds 12, 14.

Figure 9:
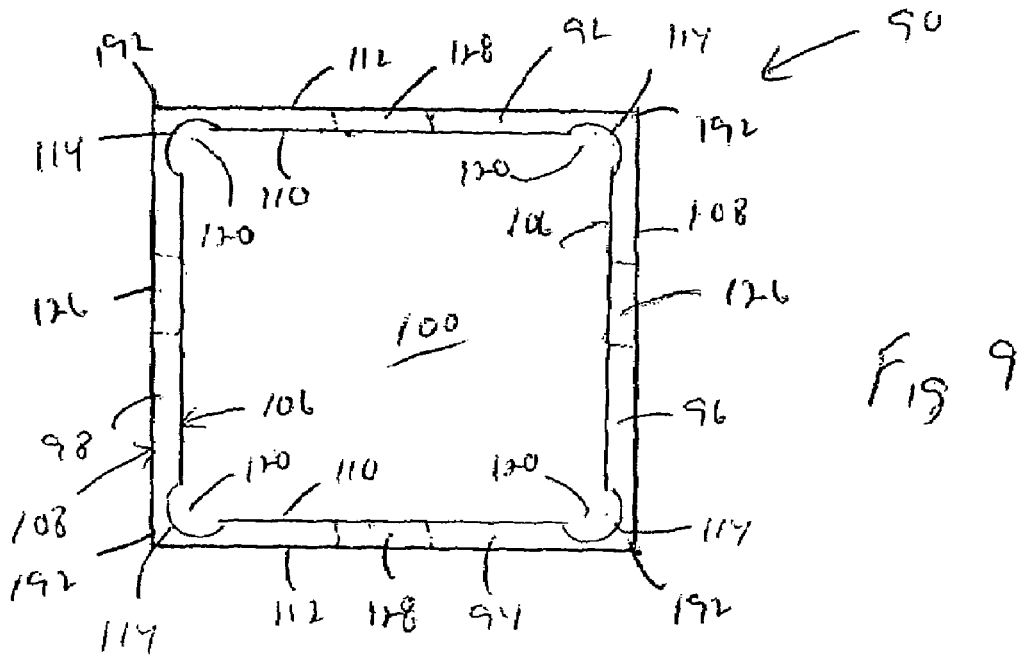
FIG. 9 is a top view of the box frame of FIG. 2.
Figure 10:
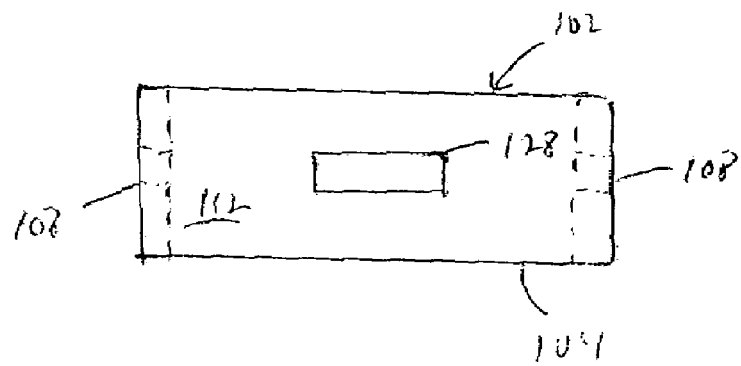
FIG. 10 is a side view of the box frame of FIG. 9.

The rectangular box frame 90, shown in FIGS. 2, 9, and 10, is slidably received in the cavity 62 and reciprocates in the cavity 62 between the cavity end walls 68, 70. The box frame 90 includes opposing end walls 92, 94 joined by opposing side walls 96, 98 to define a frame interior 100. The end walls 92, 94 and side walls 96, 98 extend between upper and lower surfaces 102, 104 of the box frame 90. Preferably, the interior surfaces 106 and exterior surfaces 108 of the side walls 96, 98 and the interior surfaces 110 and exterior surfaces 112 of the end walls 92, 94 are substantially perpendicular to the upper and lower surfaces 102, 104 of the box frame 90 to simplify installation and provide a reliable and sensitive meter 10. The interior corners 114 of the box frame 90 are recessed to form reservoirs 120 in fluid communication with a reciprocating sliding block 122. Advantageously, the reservoirs 120 hold ink to lubricate the reciprocating sliding block 122 and allow the interior surfaces 106, 110 of the end and side walls 92, 94, 96, 98 to be formed substantially perpendicular to the upper and lower surfaces 102, 104 of the box frame 90 along their entire length.

The exterior surfaces 112 of the end walls 92, 94 of the box frame 90 slidably engage the side walls 64, 66 of the cavity 62 as the box frame 90 reciprocates between the cavity end walls 68, 70. As the box frame 90 reciprocates in the cavity 62, the box frame side walls 96, 98 alternatively abut the cavity end walls 68, 70 to form alternately expanding and collapsing volumes, volume C and volume D (shown in FIGS. 15–18), between facing pairs of cavity end walls 68, 70 and box frame side walls 96, 98.

An opening 126 formed in each box frame side wall 96, 98 allows ink to alternately flow through the respective box frame side walls 96, 98 and alternately expand and collapse Volumes C and D to alternately urge the box frame 90 toward the cavity end walls 68, 70. An opening 128 formed in each box frame end wall 92, 94 midway between the box frame side walls 96, 98 can be provided to allow ink to flow between the box frame end walls 92, 94 and the adjacent cavity side wall 64, 66 to reduce friction. Preferably, the opening 128 formed in each box frame end wall 92, 94 is not in direct fluid communication with any of the reservoirs 80.

Figure 11:
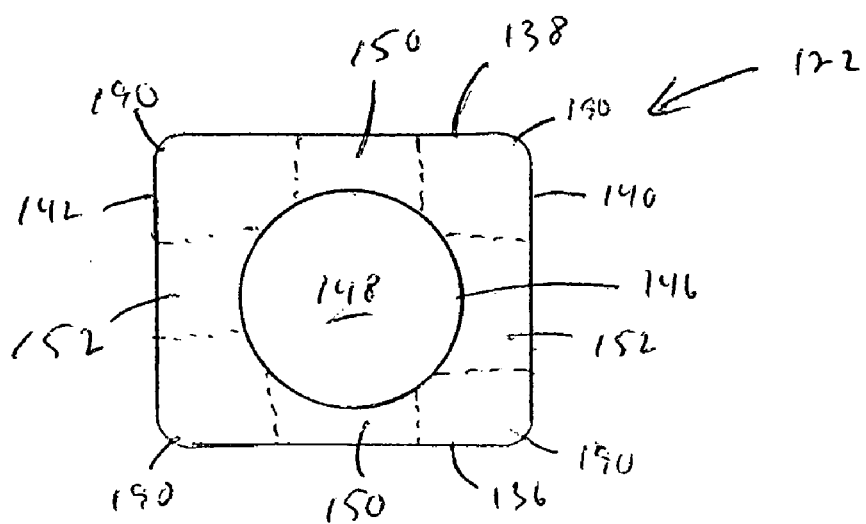
FIG. 11 is a top view of the sliding block of FIG. 2.
Figure 12:
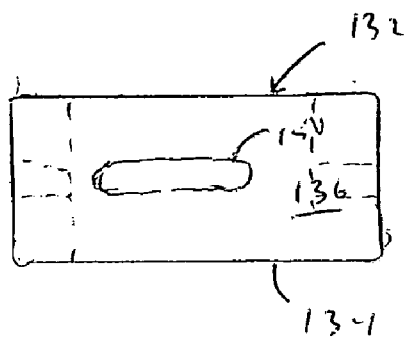
FIG. 12 is a side view of the sliding block of FIG. 11.

The sliding block 122 shown in FIGS. 2, 11, and 12, is received in the frame interior 100 and reciprocates in the frame interior 100 between the box frame end walls 92, 94. The sliding block 122 is rectangular having an upper surface 132 and lower surface 134 joined by opposing sides 136, 138 and opposing ends 140, 142. Each of the opposing ends 140, 142 slidably engage the interior surface 106 of one of the side walls 96, 98 of the box frame 90. Each side 136, 138 of the sliding block 122 alternatively abuts the interior surface 110 of one of the end walls 92, 94 of the box frame 90. The sliding block 122 reciprocates in the frame interior 100 to form alternately expanding and collapsing volumes, volume A and volume B (shown in FIGS. 15–18), between facing pairs of sliding block sides 136, 138 and end walls 92, 94 of the box frame 90.

A centrally located circular bore 146 formed through the upper and lower surfaces 13, 134 of the sliding block 122 defines a valve disc receptacle 148. A slotted opening 150, 152 formed through each side 136, 138 and end 140, 142 of the sliding block 122 intersects with the valve disc receptacle 148. The slotted opening 150 formed through each sliding block end 140, 142 is in fluid communication with the opening 126 of the adjacent box frame side wall 96, 98, such that fluid flowing through the slotted opening 150 formed through the sliding block end 140, 142 also flows through the opening 126 formed through the adjacent box frame side wall 96, 98. Preferably, the sliding block 122 is formed from aluminum with a nickel coating to minimize corrosion caused by the ink and reduce friction between the sliding block 122, box frame 90, and top and bottom manifolds 14, 12.

Figure 13:
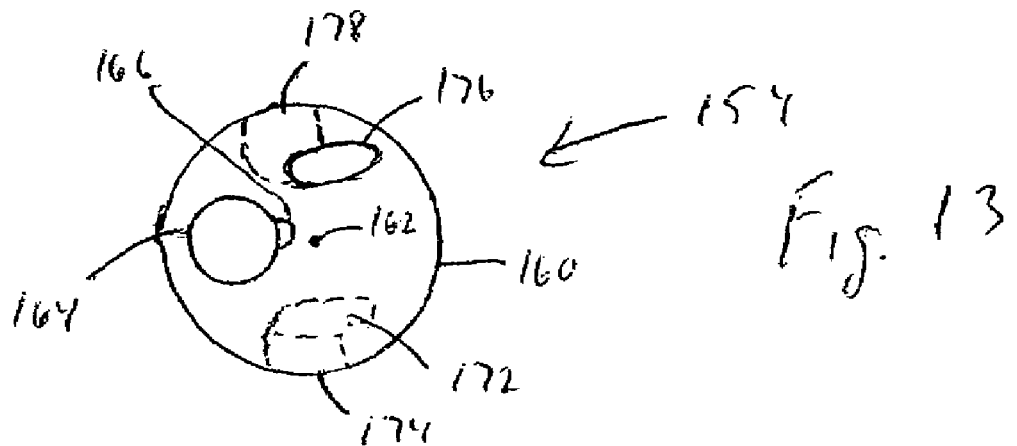
FIG. 13 is a top view of the valve disc of FIG. 2.
Figure 14:
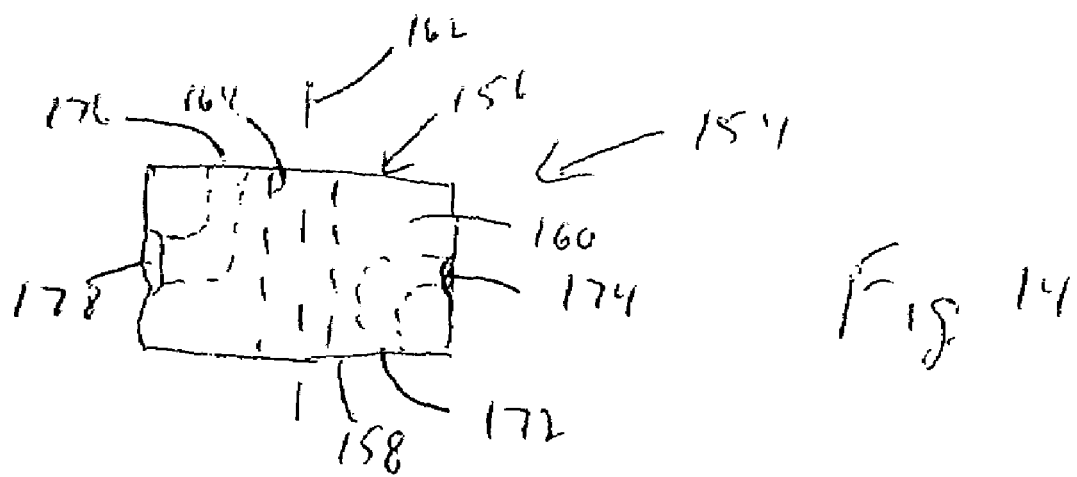
FIG. 14 is a side view of the valve disc of FIG. 13.
Figure 15:
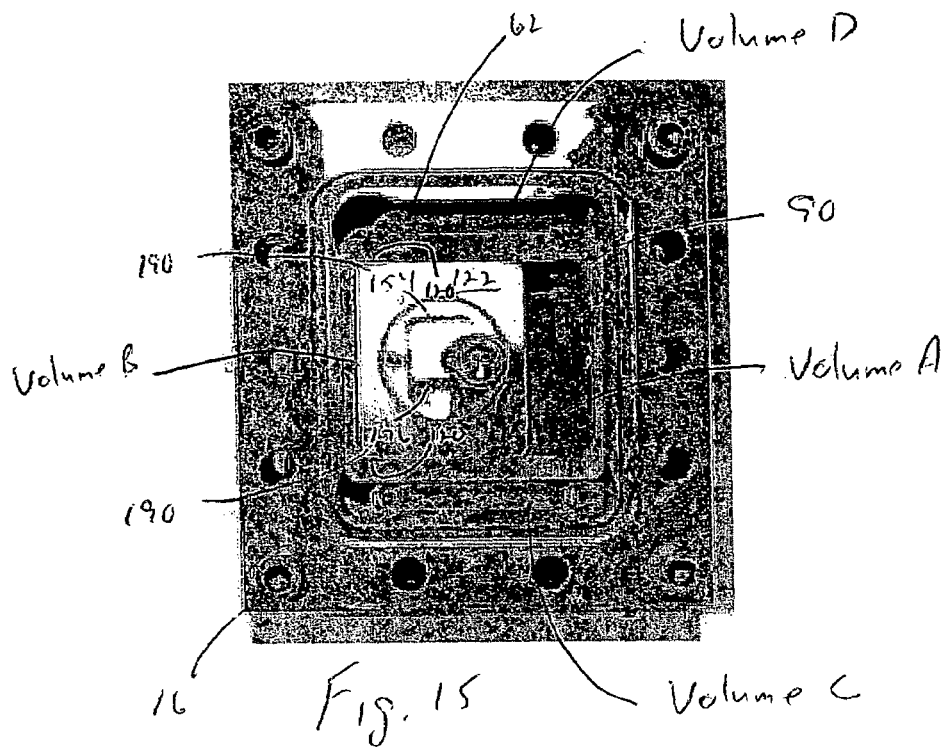
FIG. 15 is top view of the meter with the top manifold removed.
Figure 16:
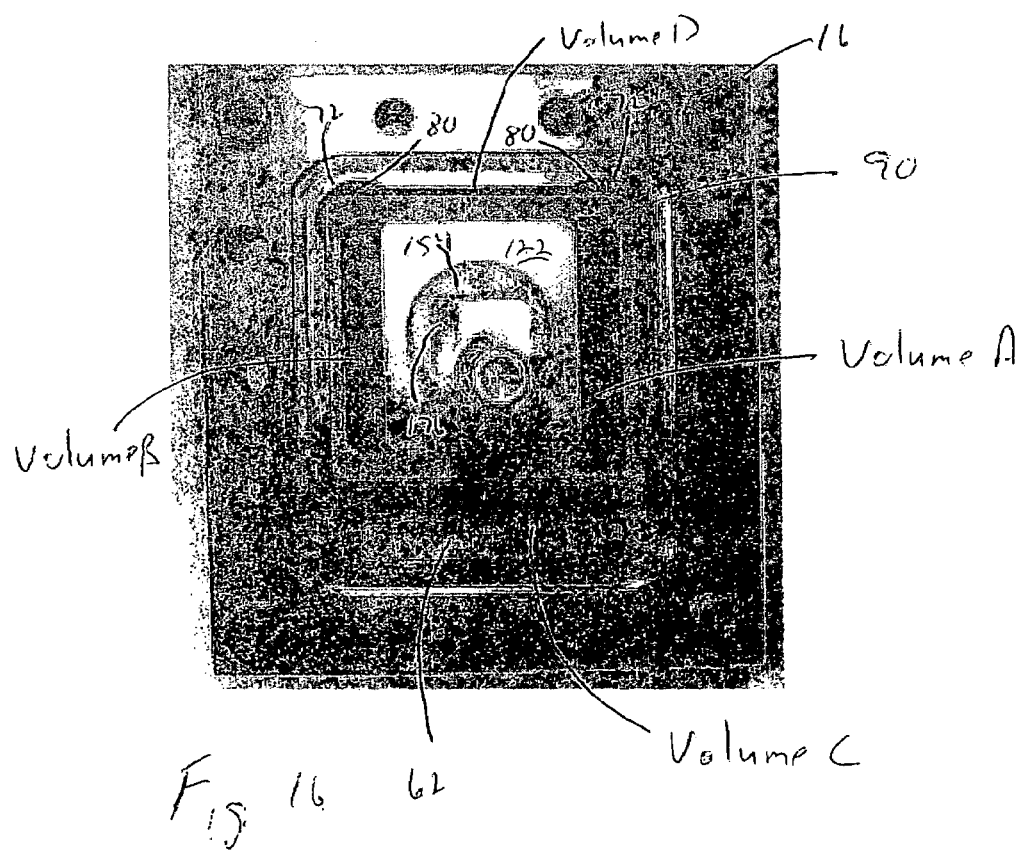
FIG. 16 is a top view of the meter with the top manifold removed and the shaft rotated a quarter turn from the shaft position shown in FIG. 15.
Figure 17:
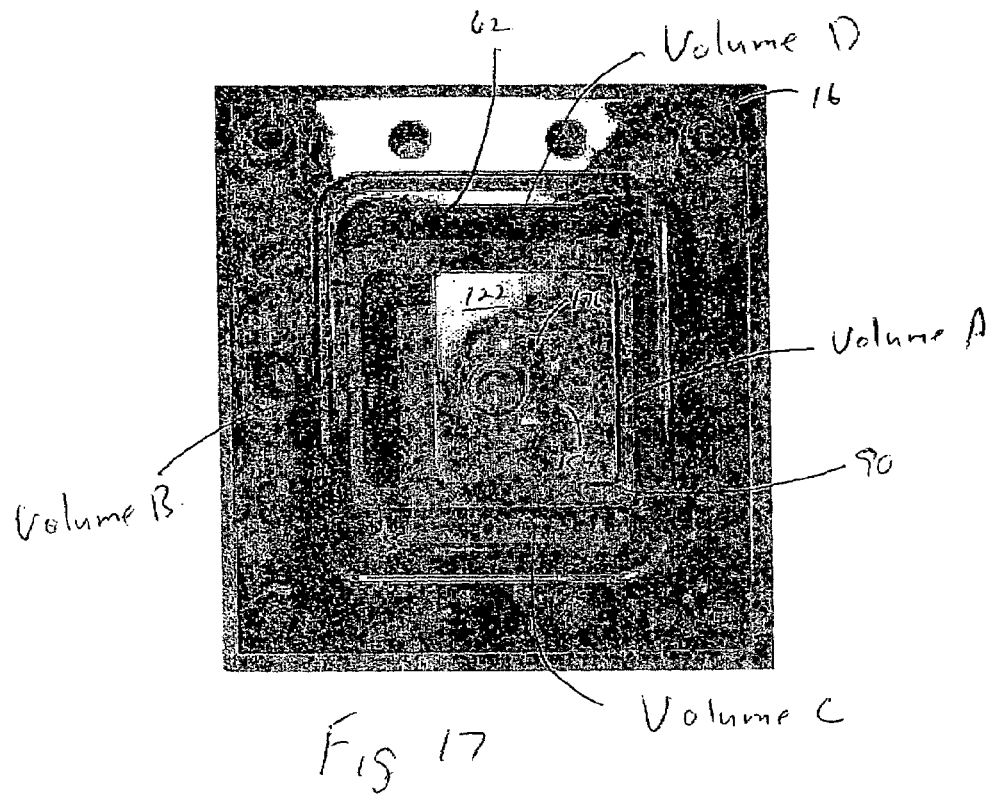
FIG. 17 is a top view of the meter with the top manifold removed and the shaft rotated a quarter turn from the shaft position shown in FIG. 16.
Figure 18:
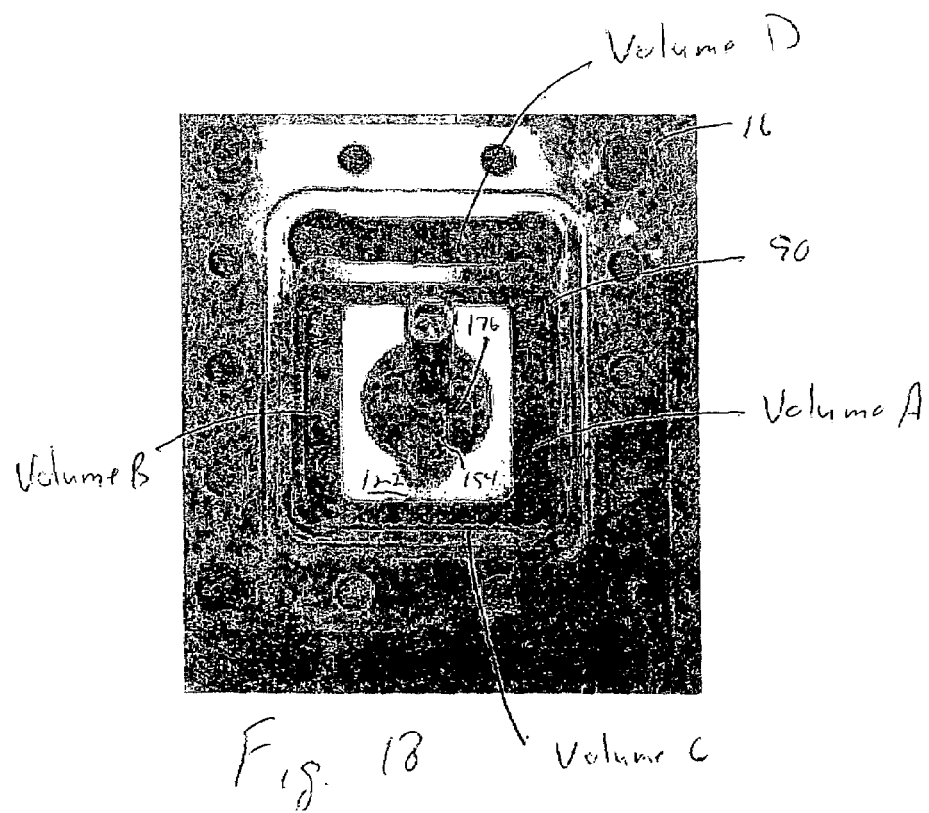
FIG. 18 is a top view of the meter with the top manifold removed and the shaft rotated a quarter turn from the shaft position shown in FIG. 17.

A valve disc 154 shown in FIGS. 2, 13, and 14 is slidably received in the valve disc receptacle 148 formed in the sliding block 122. The valve disc 154 has a top surface 156 and a bottom surface 158 joined by a circumferential side 160. A center axis 162 extends through the top and bottom surfaces 156, 158. An eccentric hole 164 offset from the valve disc center axis 162 extends through the valve disc top and bottom surfaces 156, 158 and receives the shaft 18. An axial slot 166 formed in the hole 164 receives a key 168 extending radially from the shaft 18 to rotatably fix the shaft 18 with the valve disc 154. Preferably, the valve disc 154 is formed from a plastic, low friction, material, such as EPT, a terpolymer elastomer made from ethylene-propylene diene monomer.

An intake opening 172 formed in the bottom surface 158 of the valve disc 154 is in fluid communication with an intake slot 174 formed in the circumferential side 160 of the valve disc 154. Ink pumped into the meter 10 through the bottom manifold passageway 32 flows through the intake opening 172 of the valve disc 154 and out of the intake slot 174 to fill one of the volumes A, B, C, D and move the sliding block 122 or box frame 90. An exhaust opening 176 formed in the top surface 156 of the valve disc 154 is in fluid communication with an exhaust slot 178 formed in the circumferential side 160 of the valve disc 154. The exhaust slot 178 is diametrically opposed to the intake slot 174 in order to allow the fluid in the collapsing volume A, B, C, D (i.e., the volume A, B, C, D opposed to the expanding volume A, B, C, D) to escape through the exhaust opening 176.

As shown in FIG. 2, the shaft 18 extends through the hole 164 formed through the valve disc 154, and is radially supported by the central bores 38, 54 of the top and bottom manifolds. The lower end 40 of the shaft 18 is hollow to form a spring receptacle (not shown) which receives a spring (not shown) that axially urges the shaft toward the top manifold 14. A radially extending hole (not shown) formed in the shaft 18 is in fluid communication with the spring receptacle allows ink to flow therethrough. The radially extending hole is located below the valve disc 154 to prevent ink from bypassing the valve disc 154 through the shaft 18. A key 168, such as an outwardly biased ball, extends radially from the shaft and is received in the slot 166 formed in the valve disc hole 164.

An upper end 180 of the shaft 18 supports the magnet holder 20 that is axially and rotatably fixed to the shaft 18. The magnet holder 20 supports six axially extending magnets 22. Each of the magnets 22 have a magnetic force that is detected by Hall Effect sensors forming part of meter circuitry 182 mounted over the magnets 22. Preferably, each of the magnets 22 are nickel coated to prevent corrosion.

A non-conductive magnet cover 186 mounted to the top manifold 14 over the magnet holder 20 protects the circuitry 182 from ink flowing through the meter 10. A sealing material 188, such as an O-ring, interposed between the magnet cover 186 and top surface 42 of the top manifold prevents ink from leaking between the magnet cover 186 and top manifold 14.

The circuitry 182, in the form of an integrated circuit board, is mounted above the magnets 22 to the magnet cover 186. The circuitry 182 includes the Hall Effect sensors that detect the magnets 22 as the shaft 18 rotates and a clock to determine the rotational speed of the shaft 18. Advantageously, given the known volume of ink that flows through the meter 10 for each revolution, or portion thereof, of the shaft 18, once the rotational speed of the of the shaft 18 is known the circuitry 182 can calculate the volumetric flow rate of the ink flowing through the meter. Of course, if the circuitry 182 has sufficient memory and calculation speed, other parameters can be calculated, such as the pounds of ink flowing through the meter 10. Alternatively, the circuitry 182 can merely provide a signal indicating shaft rotation which is then used by a computer to perform the volumetric calculations.

A card cover 184 protecting the circuitry 182 can be mounted to the magnet cover 186 over the circuitry 182. Preferably, the card cover 184 is formed from a clear plastic that allows a user to view lights or a display forming part of the circuitry 182.

In use, referring to FIGS. 2–15, in general, ink is pumped into the flow meter 10 through the input port 34 and passageway 32 formed in the bottom manifold 12. The ink flows into the valve disc intake opening 172 and through the intake slot 174 and opening 150 formed in the sliding block side 136 to expand volume A. Simultaneously, the exhaust slot 178 is in fluid communication with the opening 150 formed in the opposing sliding block side 138 to allow fluid to escape from volume B which allows the sliding block 122 to slide to the left and force the rotation of the shaft 18 and valve disc 154 a quarter turn. Ink escaping from the volume B passes through the passageway 48 formed through the top manifold 14, and exhausts from the meter 10 through the exhaust port 50.

Advantageously, as the sliding block 122 slides to the left, two of the exterior corners 190 of the sliding block 122 are each urged into one of the reservoirs 120 formed at the interior corners 114 of the box frame 90. Ink urged into the reservoirs 120 by the sliding block 122 is forced onto the ends 140, 142 of the sliding block to lubricate the ends 140, 142 and reduce friction between the ends 140, 142 and interior surface 106 of the box frame side walls 96, 98.

Referring now to FIGS. 2–14 and 16, as the valve disc 154 continues to rotate, the intake slot 174 comes into fluid communication with the openings 150, 126 formed through the sliding block end 140 and box frame side walls 96 to expand volume C. Simultaneously, as the valve disc 154 rotates, the exhaust slot 178 comes in fluid communication with the openings 150, 126 formed through the opposing sliding block end and box frame side walls 142, 98 to allow ink in volume D to escape which allows the box frame 90 to slide rearwardly and force the rotation of the shaft 18 and valve disc 154 a second quarter turn. Ink escaping from the volume B passes through the passageway 48 formed through the top manifold 14, and exhausts from the meter 10 through the exhaust port 50.

Advantageously, as the box frame 90 slides rearwardly, two of the exterior corners 192 of the box frame 90 are each urged into one of the reservoirs 80 formed at the interior corners 72 of the cavity 62. Ink urged into the reservoirs 80 by the box frame 90 is forced onto the exterior surface 112 of the box frame end walls 92, 94 to lubricate the box frame end walls 92, 94 and reduce friction between the box frame end walls 92, 94 and the cavity 62.

Referring now to FIGS. 2–14 and 17, as the valve disc 154 continues to rotate, the intake slot 174 comes in fluid communication with the opening 150 formed in the sliding block side 138 to expand volume B. Simultaneously, the exhaust slot 178 is in fluid communication with the opening 150 formed in the opposing sliding block side 136 to allow fluid to escape from volume A which allows the sliding block 122 to slide to the right and force the rotation of the shaft 18 and valve disc 154 a third quarter turn. Ink escaping from the volume C passes through the passageway 48 formed through the top manifold 14, and exhausts from the meter 10 through the exhaust port 50.

Advantageously, as the sliding block 122 slides to the right, two of the exterior corners 190 of the sliding block 122 are each urged into one of the reservoirs 120 formed at the interior corners 114 of the box frame 90. Ink urged into the reservoirs 120 by the sliding block 122 is forced onto the ends 140, 142 of the sliding block 122 to lubricate the ends 140, 142 and reduce friction between the ends 140, 142 and interior surface 106 of the side walls 96, 98 of the box frame 90.

Finally, referring to FIGS. 2–14 and 18, as the valve disc 154 continues to rotate, the intake slot 174 comes in fluid communication with the openings 150, 126 formed through the sliding block end 142 and box frame side walls 98 to expand volume D. Simultaneously, as the valve disc 154 rotates the third quarter turn, the exhaust slot 178 comes in fluid communication with the openings 150, 126 formed through the opposing sliding block end 142 and box frame side wall 96 to allow ink to escape volume C which allows the box frame 90 to slide forwardly, and force the rotation of the shaft 18 and valve disc 154 a fourth quarter turn. Ink escaping from the volume C passes through the passageway 48 formed through the top manifold 14, and exhausts from the meter 10 through the exhaust port 50.

Advantageously, as the box frame 90 slides forwardly, two of the exterior corners 192 of the box frame 90 are each urged into one of the reservoirs 80 formed at the interior corners 72 of the cavity 62. Ink urged into the reservoirs 80 by the box frame 90 is forced onto the exterior surface 112 of the box frame end walls 92, 94 to lubricate the box frame end wall 92, 94 and reduce friction between the box frame 90 and cavity 62.

As fluid is pumped through the meter 10, this cycle continues to rotate the shaft 18, and thus the magnets 22. The changing magnetic field caused by the rotating magnets 22 is detected by the circuitry 182 to determine the volumetric flow rate of ink through the meter 10.

While there have been shown and described what is at present considered the preferred embodiments of the invention, it will be obvious to those skilled in the art that various changes and modifications can be made therein without departing from the scope of the invention defined by the appended claims.

We claim:

1. A method of metering flow of fluid through a positive displacement flow meter, in which said flow meter includes a meter body defining a cavity having opposing ends joined by sides at corners, at least one of said corners being recessed to form a first reservoir, and a box frame received in said cavity for reciprocal movement between said cavity ends, said method comprising:
   urging the fluid into said first reservoir to lubricate adjacent walls of said box frame as said box frame reciprocates in said cavity.

2. The method as in claim 1, in which said box frame urges the fluid into said first reservoir to lubricate said adjacent walls of said box frame.

3. The method as in claim 1, in which said box frame walls define a frame interior, said frame interior includes interior corners, and at least one of said interior corners is recessed to form a second reservoir, and a sliding block is received in said frame interior for reciprocal movement in said frame interior, said method including urging the fluid into said second reservoir to lubricate said sliding block as said sliding block reciprocates in said frame interior.

4. The method as in claim 3, in which said siding block urges the fluid into said second reservoir to lubricate said sliding block.

5. A positive displacement flow meter comprising:
   a meter body defining a cavity having opposing ends joined by sides at corners, at least one of said corners being recessed to form a first reservoir; and
   a box frame received in said cavity for reciprocal movement between said cavity ends, said first reservoir being in fluid communication with said box frame;
   a sliding block received in said frame interior for reciprocal movement in said frame interior, said sliding block defining a circular cavity;
   a valve disc received in said circular cavity for rotational movement therein, said valve disc including an eccentric bore formed therethrough; and
   a shaft extending through said eccentric hole and rotatably fixed to said valve disc, wherein fluid flowing through the flow meter reciprocally moves said box frame and sliding block to rotate said valve disc and said shaft.

6. The positive displacement flow meter as in claim 5, in which said box frame including walls defining a frame interior, said frame interior including interior corners, and at least one of said interior corners is recessed to form a second reservoir.

7. The positive displacement flow meter as in claim 6, in which a sliding block is received in said frame interior for reciprocal movement in said frame interior, and said second reservoir is in fluid communication with said sliding block.

8. The positive displacement flow meter as in claim 6, in which a second reservoir is formed in each of said interior corners of said frame interior.

9. The positive displacement flow meter as in claim 5, in which a first reservoir is formed in each of said corners of said cavity.

* * * * *